(12) United States Patent
Polaganga

(10) Patent No.: US 12,133,131 B2
(45) Date of Patent: Oct. 29, 2024

(54) REDIRECTION AND HANDOVER TO VOICE OVER NEW RADIO (VoNR) LAYERS

(71) Applicant: T-Mobile USA, Inc., Bellevue, WA (US)

(72) Inventor: Roopesh Kumar Polaganga, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 576 days.

(21) Appl. No.: 17/512,393

(22) Filed: Oct. 27, 2021

(65) Prior Publication Data

US 2023/0130540 A1    Apr. 27, 2023

(51) Int. Cl.
*H04W 36/00*    (2009.01)
*H04W 36/08*    (2009.01)
*H04W 36/16*    (2009.01)

(52) U.S. Cl.
CPC ......... *H04W 36/165* (2013.01); *H04W 36/08* (2013.01)

(58) Field of Classification Search
CPC .............. H04W 36/165; H04W 36/08; H04W 36/00226
USPC .......................................... 370/331; 455/312
See application file for complete search history.

(56) References Cited

U.S. PATENT DOCUMENTS

| | | |
|---|---|---|
| 2019/0394688 A1 | 12/2019 | Zhu et al. |
| 2022/0022102 A1* | 1/2022 | Talat ..................... H04W 36/13 |
| 2022/0159522 A1* | 5/2022 | Cui ................. H04W 36/00835 |
| 2022/0295360 A1 | 9/2022 | Nagarajan et al. |

FOREIGN PATENT DOCUMENTS

WO    2020097215 A1    5/2020

OTHER PUBLICATIONS

Qualcomm Incorporated: "Remaining Issues in UE Radio Capability for IMS Voice", 3GPP Draft; R2-1814226, vol. RAN WG2, No. Chengdu, China; Oct. 8, 2018-Oct. 12, 2018, Oct. 8-12, 2018, XP051523679, Retrieved at: https://www.3gpp.org/ftp/tsg_ran/WG2_RL2/TSGR2_103bis/Docs/R2-1814226.zip, 6 pages.

International Search Report and Written Opinion received in International Application No. PCT/US2022/078083 mailed on Oct. 13, 2022, 22 pages.

* cited by examiner

*Primary Examiner* — Marcos Batista
(74) *Attorney, Agent, or Firm* — Foley IP Law, PLLC

(57) ABSTRACT

Solutions for providing a data traffic session include: while a voice over new radio (VoNR) capable user equipment (UE) is being served by a first cell that does not support VoNR, determining that a second cell that does support VoNR is available to serve the UE; transferring the UE to service by the second cell; and providing a VoNR call to the UE through the second cell. The transfer may comprise a redirection or a handover (based on whether the UE is already in a call). Some examples further include a trigger of: receiving a notification of an incoming voice call to the UE, receiving a notification of an outgoing voice call from the UE, and receiving a notification of a handover of a voice call for the UE.

20 Claims, 5 Drawing Sheets

REDIRECTION AND HANDOVER TO VOICE OVER NEW RADIO (VoNR) LAYERS

BACKGROUND

Fifth generation cellular technology (5G) is often referred to as new radio (NR), whereas fourth generation cellular technology (4G) is often referred to as long term evolution (LTE). For 5G standalone (SA) implementations, voice calls may be provided as voice over NR (VoNR) calls. However, during the transition as 5G is built out in various cellular networks, not all 5G cells in a network may have VoNR enabled. Thus, at least some voice calls for VoNR-capable cellular devices (user equipment, or UEs) continue to be placed over 4G voice services—even when the VoNR-capable UE attempts to place a voice call from a 5G cell. The redirection from 5G to 4G voice (e.g., voice over LTE, or VoLTE) is referred to as voice over evolved packet system (EPS) fallback (VoEPSFB).

At some cellular sites, multiple layers (e.g., independent calls covering a common area) exist. For example, there may be a 5G cell that does not support VoNR operating at a first band providing a first layer, and a 5G cell that does support VoNR operating at a second band providing a second layer. A 5G UE within the common area may be being served by either one of the 5G cells. Unfortunately, when users who have invested in VoNR-capable UE are being served by a 5G cell that does not support VoNR, when there is an incoming call for the UE, the call may go to VoEPSFB, depriving the user of the benefit of a superior VoNR call experience.

SUMMARY

The following summary is provided to illustrate examples disclosed herein, but is not meant to limit all examples to any particular configuration or sequence of operations.

Solutions for providing a data traffic session include: while a voice over new radio (VoNR) capable user equipment (UE) is being served by a first cell that does not support VoNR, determining that a second cell that does support VoNR is available to serve the UE; transferring the UE to service by the second cell; and providing a VoNR call to the UE through the second cell. The transfer may comprise a redirection or a handover (based on whether the UE is already in a call). Some examples further include a trigger of: receiving a notification of an incoming voice call to the UE, receiving a notification of an outgoing voice call from the UE, and receiving a notification of a handover of a voice call for the UE.

BRIEF DESCRIPTION OF THE DRAWINGS

The disclosed examples are described below with reference to the accompanying drawing figures listed below, wherein.

Figure 1:
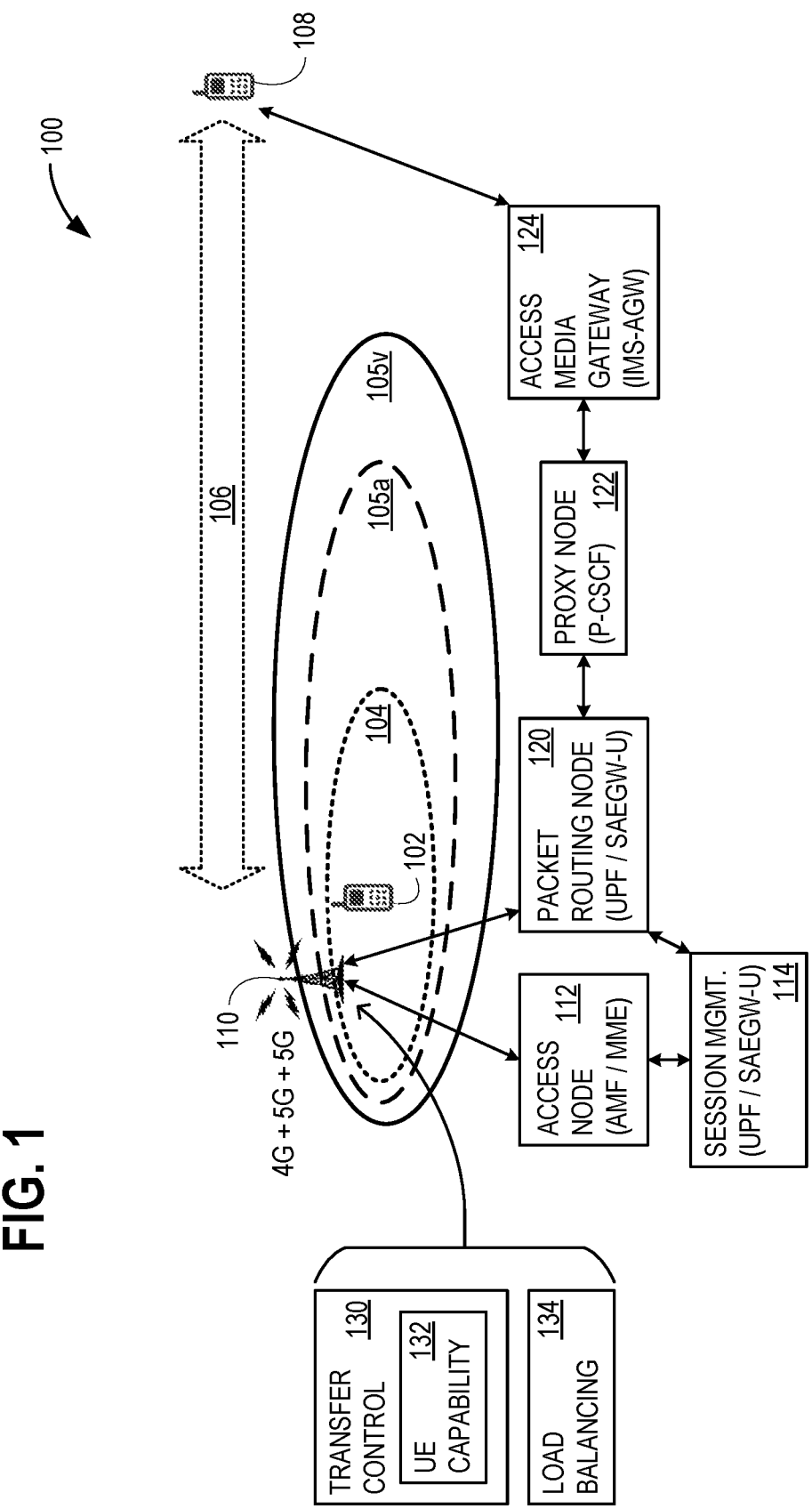
FIG. 1 illustrates an exemplary arrangement that advantageously performs redirection and handover to voice over new radio (VoNR) layers.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for providing a data traffic session include: while a voice over new radio (VoNR) capable user equipment (UE) is being served by a first cell that does not support VoNR, determining that a second cell that does support VoNR is available to serve the UE; transferring the UE to service by the second cell; and providing a VoNR call to the UE through the second cell. The transfer may comprise a redirection or a handover (based on whether the UE is already in a call). Some examples further include a trigger of: receiving a notification of an incoming voice call to the UE, receiving a notification of an outgoing voice call from the UE, and receiving a notification of a handover of a voice call for the UE.

Aspects of the disclosure therefore improve the robustness, resilience, and reliability of wireless communications (specifically, voice calls) by steering voice calls to VoNR, for example, by transferring a UE from a first cell that does not support VoNR to a second cell that supports VoNR and is available to serve the UE. This improves user experience, due to the improved performance of VoNR calls compared with voice over long-term evolution (VoLTE) calls. Additionally, in some scenarios, non-voice data traffic sessions that occur in parallel with a voice call may provide superior performance when the UE is served by a 5G cell and the voice call is VoNR.

FIG. 1 illustrates an exemplary arrangement 100 that advantageously performs redirection and handover to VoNR layers (e.g., cells that support VoNR calls). A VoNR-capable UE 102 is in the vicinity of a gNodeB (gNB) 110 that provides a fifth generation cellular technology (5G) cell 105*v*. Other cells (e.g., layers of service) are provided by co-located gNBs: a fourth generation cellular technology (4G) cell 104 and a 5G cell 105*a*. 4G is also referred to as long term evolution (LTE), and 5G is also referred to as new radio (NR). In the illustrated scenario, cell 104 supports only VoLTE, cell 105*a* does not support VoNR, and cell 105*v* does support VoNR. In the position of UE 102 relative to gNB 110, as shown, UE 102 may be served by any one of cells 104, 105*a*, and 105*v*.

Thus, when UE 102 attempts to place a voice call, the voice call will be VoLTE if UE 102 is being served by cell 104 (due to UE 102 being backward-compatible with LTE), voice over evolved packet system (EPS) fallback (VoEPSFB) if UE 102 is being served by cell 105*a*, and VoNR if UE 102 is being served by cell 105*v*. VoEPSFB uses 4G voice infrastructure (VoLTE) for voice calls, and so may not perform as well as VoNR. This means that, without the redirection and handover to the VoNR layer (cell 105*v*), the quality of the experience for the user of UE 102 may depend on whether UE 102 had been previously registered with cell 105*a*, rather than cell 105*v*. If UE 102 is not placing a voice call, and merely sending or receiving text messages, the service by cell 105*a* (rather than by cell 105*v*) does not impact the user of UE 102. However, when UE 102 either attempts to place a voice call to another device (e.g., UE 108), or there is an incoming voice call, gNB 110 redirects UE 102 to cell 105*v* so that UE 102 may have a VoNR call 106 with UE 108—at least up to internet protocol (IP) multimedia subsystem (IMS) access media gateway (IMS-AGW) 124. (gNB 110 has no control over the voice call on the side of UE 108.)

VoNR call 106 flows from gNB 110 as a packet data traffic session through a packet routing node 120, and a proxy node 122, to IMS-AGW 124. An access node 112 and a session management node 114 provide management of data traffic sessions (including voice calls) for UE 102. In 5G, access node 112 may be an access mobility function (AMF), session management node 114 may be a session management function (SMF), and packet routing node 120 may be a user plane function (UPF). In 4G, access node 112 may be a mobility management entity (MME), session management node 114 may be a system architecture evolution (SAE) gateway-control plane (SAEGW-C), and packet routing node 120 may be an SAE gateway-user plane (SAEGW-U). Proxy node 122 may be a proxy-call session control function (P-CSCF). Standalone (SA) NR is a 5G deployment that uses 5G for both signaling (management) and user plane traffic, whereas non-SA NR is 5G deployment that uses 5G for user plane traffic and 4G infrastructure for signaling. In the illustrated example, cell 105v is an SA NR cell.

UE 102 provides UE capability information 132 in a UE Capability Information Indication message, which identifies the capability of UE 102 with respect to 4G, 5G, frequency bands, and VoNR capability, among other information. UE capability information 132 is stored in gNB 110 and/or access node 112. UE 102 may be assigned to a specific cell by gNB 110 based, in part, on UE capability information 132. For example, in addition to differences between 4G and 5G, different cells within 4G and 5G are distinguished by frequency and duplex mode. For example, an n41 5G band uses time-division duplexing (TDD) at 2500 megahertz (MHz), whereas an n71 5G band uses frequency-division duplexing (FDD) at 600 MHz. There are currently dozens of different bands among 4G and 5G, using various center frequencies, duplexing, and bandwidths.

A transfer control 130 at gNB 110 handles the transfer, whether redirection (while UE 102 is in idle mode) or handover (while UE 102 is in connected mode), of UE 102 to the VoNR layer (cell 105v), so that UE may experience VoNR call 106. Since gNB 110 may serve a large number of other UEs, load balancing 134 attempts to minimize the likelihood that one of the cells (layers) is overloaded, and can steer an incoming UE away from a heavily loaded cell. Thus, it is possible, that if cell 105v is overloaded (e.g., already loaded above 70% when UE 102 moves unto the vicinity of gNB 110), UE might not be redirected to cell 105v and will instead have a VoEPSFB call on cell 105a. Other load balancing measures may include splitting up a session of UE 102 across two different layers.

Figure 2:
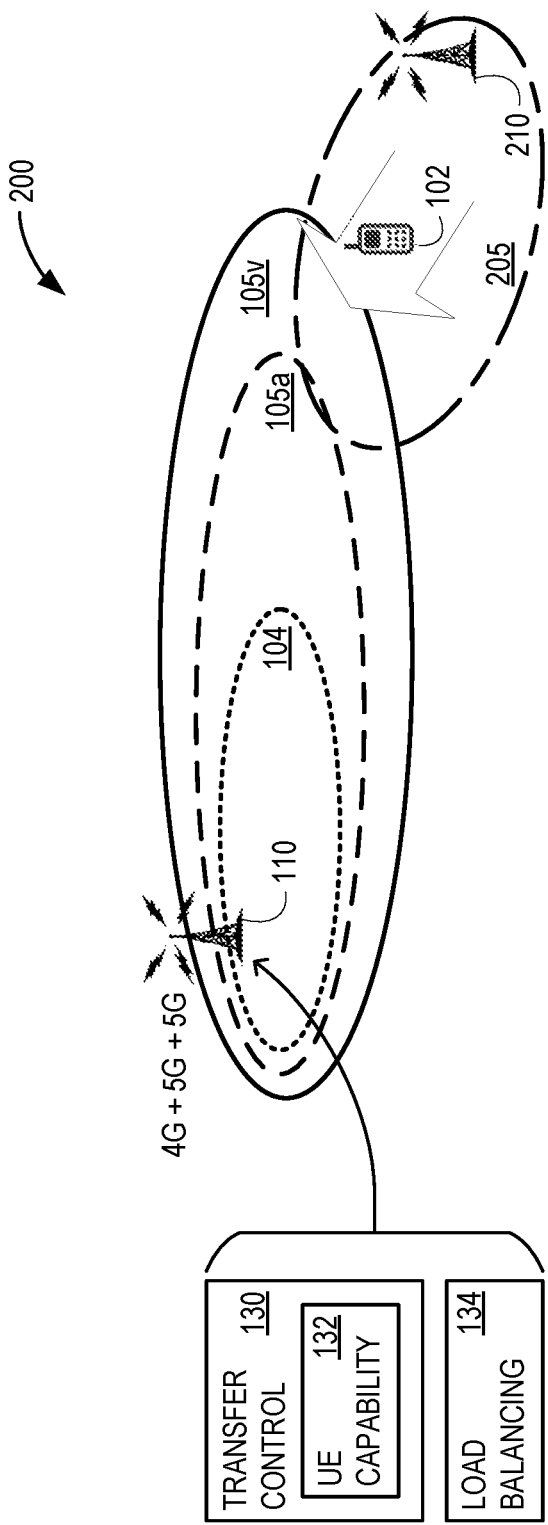
FIG. 2 illustrates a handover scenario that may occur with examples of the arrangement of FIG. 1.

FIG. 2 illustrates a handover scenario 200 that may occur with examples of arrangement 100. Specifically, scenario 200 illustrates a handover of UE 102 from gNB 210, providing a cell 205 to gNB 110 providing cell 105v. In scenario 200, UE 102 is already in connected mode (e.g., a voice call is ongoing), and is moving away from gNB 210 toward gNB 110. Transfer control 130 determines that gNB 210 is attempting to hand off UE 102, and that UE 102 has an ongoing voice call as opposed to being in idle mode. Transfer control 130 also determines that UE 102 is VoNR-capable from UE capability information 132.

Unless cell 105v is overloaded (e.g., at or above 70% capability, or another threshold), UE 102 will be transferred to cell 105v. If cell 105v had been overloaded, UE 102 was in idle mode, or UE 102 was not VoNR capable, UE 102 may have instead been transferred to cell 104 or 105a. If cell 205 did not support VoNR, then UE 102 would be using 4G voice (VoLTE or VoEPSFB), and during the handover (transfer) to cell 105v, the voice call is upgraded to VoNR.

Figure 3:
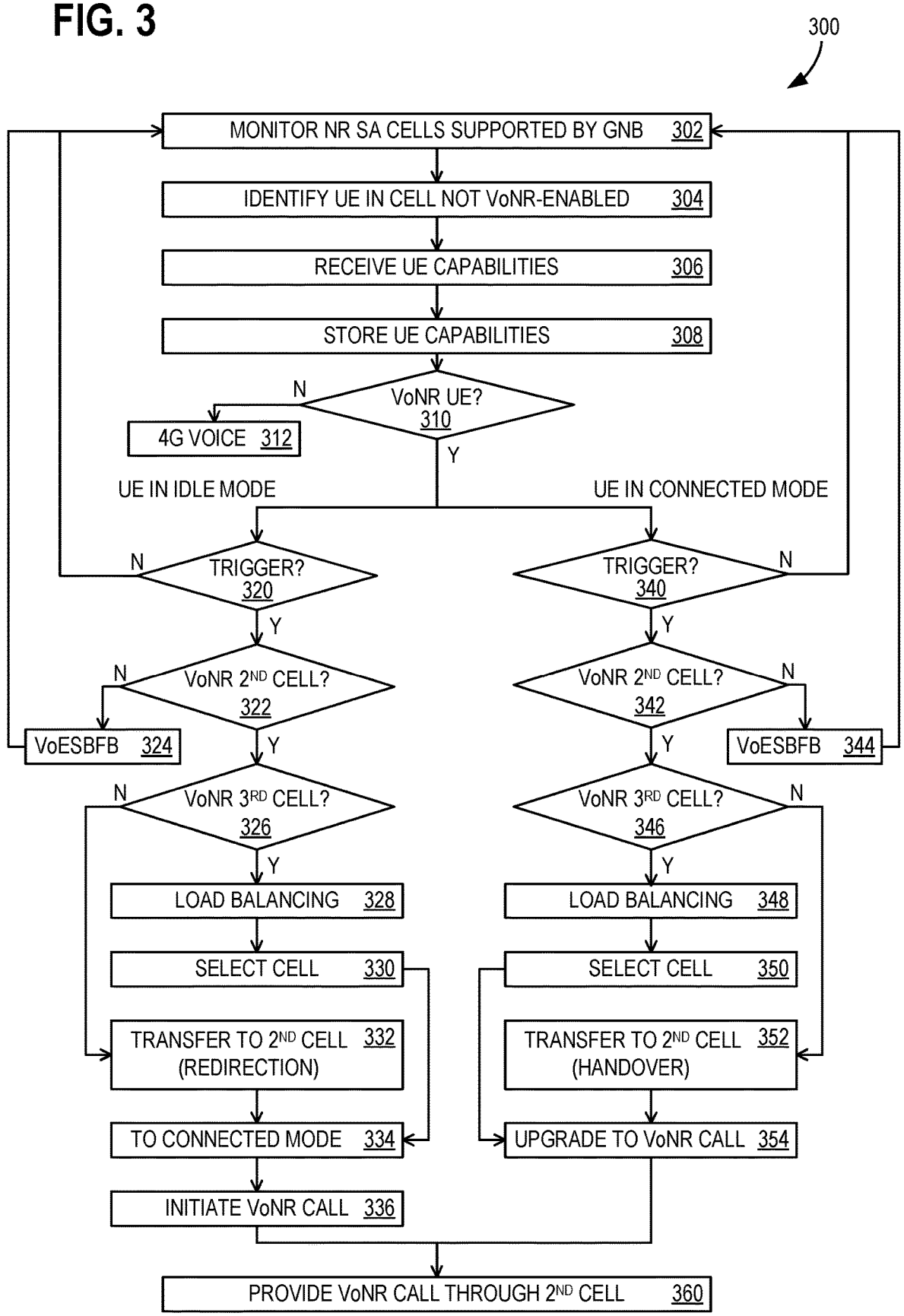
FIG. 3 illustrates a flowchart of exemplary operations associated with examples of the arrangement of FIG. 1.

FIG. 3 illustrates a flowchart 300 of exemplary operations associated with examples of arrangement 100 performing redirection and handover to voice over new radio (VoNR) layers. In some examples, at least a portion of flowchart 300 may each be performed using one or more computing devices 500 of FIG. 5. Flowchart 300 commences with monitoring NR SA cell 105v supported by gNB 110, in operation 302. Operation 304 identifies UE 102 in cell 104, 105a, or 205 (a first cell), which does not support VoNR. In some examples, the first cell comprises a 5G cell operating in a first band. In some examples, the first cell comprises a 4G cell.

UE capability information 132 is received by gNB 110 in operation 306, which is stored in gNB 110 and/or access node 112 in operation 308. A decision operation 310 determines whether UE 102 is VoNR-capable. If not, UE 102 will use 4G voice for any voice calls, as indicated in box 312, and transfer to cell 105v is not prioritized (e.g., UE 102 may be transferred to or continue to be served by cell 105a). If, however, gNB 110 determines that UE 102 is VoNR-capable (in decision operation 310), flowchart 300 splits into two branches.

An idle mode branch, comprising operations 320-336, is followed if UE 102 is in idle mode, whereas a connected mode branch, comprising operations 340-354, is followed if UE 102 is already in connected mode. The idle mode and connected mode branches are largely similar, although the idle mode branch has an operation for initiating a voice call (moving into connected mode and requesting a voice bearer) and the transfer comprises a redirection for the idle mode branch but a handover for the connected mode branch.

Following first the idle mode branch, decision operation 320 determines whether a trigger condition has occurred for determining whether a VoNR-enabled cell is available to serve UE 102 (e.g., whether a potential need exists to transfer UE 102 from cell 104 or 105a). In some examples, the trigger may be receiving a notification of an incoming voice call to UE 102 and receiving a notification of an outgoing voice call from UE 102. These may be a mobile termination (MT) or a mobile origination (MO) message, respectively. In some examples, gNB 110 determines the trigger. Absent a trigger condition, flowchart returns to operation 302.

Otherwise, decision operation 322 determines whether cell 105v (a VoNR-enabled cell, or a VoNR layer) is available to serve UE 102. If cell 105v is not available (e.g., due to overloading), UE 102 is not transferred and uses VoEPSFB, as indicated in box 324. Flowchart then returns to operation 302. Otherwise, decision operation 322 determines that cell 105v (a second cell that does support VoNR) is available to serve UE 102. This occurs while VoNR-capable UE 102 is being served by the first cell (cell 104 or 105a) that does not support VoNR. In some examples, cell 105v comprises a 5G cell operating in a different band than the band in which cell 105a operates. In this idle mode branch of flowchart 300, determining that the VoNR service is available to UE 102 is contemporaneous with UE 102 transitioning from idle mode to connected mode.

Decision operation 326, which also occurs while UE 102 is being served by the first cell, determines whether a third cell that supports VoNR is available to serve UE 102. In some scenarios, there may be multiple overlapping VoNR-enabled SA NR cells. If there are multiple overlapping VoNR-enabled SA NR cells, a load balancing determination is performed for those cells, in operation 328. In operation 330, one of the cells (e.g., cell 105v) is selected, over the other VoNR-enabled SA NR cell(s) to serve UE 102, based on at least the load balancing performed in operation 328. If there had not been multiple overlapping VoNR-enabled SA NR cells, flowchart moves from decision operation 326 directly to operation 332.

Operation 332 includes transferring UE 102 to service by cell 105v. In some examples, the transfer comprises a redirection (e.g., operation 332 performs a redirection of UE 102 to selected 5G cell 105v). In operation 334, UE 102 transitions from idle mode into connected mode, and operation 336 initiates VoNR call 106. Flowchart 300 then moves to operation 360, which provides VoNR call 106 to UE 102 through the cell 105v.

Turning now to the connected mode branch of flowchart 300, decision operation 340 determines whether a trigger condition has occurred for determining whether a VoNR-enabled cell is available to serve UE 102 (e.g., whether a potential need exists to transfer UE 102 from cell 205). In some examples, the trigger may be receiving a notification of an incoming handover of a voice call for UE 102. In some examples, gNB 110 determines the trigger. Absent a trigger condition, flowchart returns to operation 302.

Otherwise, decision operation 342 determines whether cell 105v is available to serve UE 102. If cell 105v is not available (e.g., due to overloading), UE 102 is not transferred and uses VoEPSFB, as indicated in box 344. Flowchart then returns to operation 302. Otherwise, decision operation 342 determines that cell 105v is available to serve UE 102. This occurs while VoNR-capable UE 102 is being served by the first cell (cell 205) that does not support VoNR. In this idle mode branch of flowchart 300, determining that the VoNR service is available to UE 102 occurs while UE 102 is already in connected mode (e.g., UE 102 is connected with a VoEPSFB or VoLTE call).

Decision operation 346, which also occurs while UE 102 is being served by the first cell, determines whether a third cell that supports VoNR is available to serve UE 102. In some scenarios, there may be multiple overlapping VoNR-enabled SA NR cells. If there are multiple overlapping VoNR-enabled SA NR cells, a load balancing determination is performed for those cells, in operation 348. In operation 350, one of the cells (e.g., cell 105v) is selected, over the other VoNR-enabled SA NR cell(s) to serve UE 102, based on at least the load balancing performed in operation 348. If there had not been multiple overlapping VoNR-enabled SA NR cells, flowchart moves from decision operation 346 directly to operation 352.

Operation 352 includes transferring UE 102 to service by cell 105v. In some examples, the transfer comprises a handover (e.g., operation 352 performs a handover of UE 102 to selected 5G cell 105v). In operation 354, the 4G voice call UE 102 had been experiencing in cell 205 is upgraded to a VoNR call (and is now VoNR call 106). That is, in some examples, a VoEPSFB or VoLTE call through cell 205 is handed over as VoNR call 106 through cell 105v. Flowchart 300 then moves to operation 360, which provides VoNR call 106 to UE 102 through the cell 105v, merging the idle mode and connected mode branches.

Figure 4:
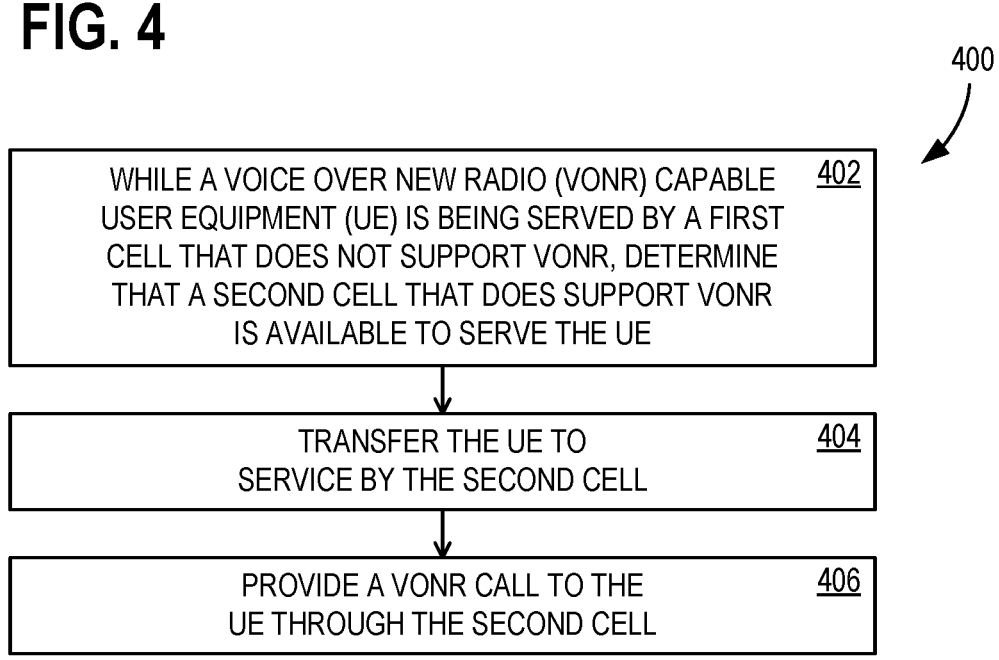
FIG. 4 illustrates another flowchart of exemplary operations associated with examples of the arrangement of FIG. 1.

FIG. 4 illustrates a flowchart 400 of exemplary operations associated with examples of arrangement 100 performing redirection and handover to voice over new radio (VoNR) layers. In some examples, at least a portion of flowchart 400 may each be performed using one or more computing devices 500 of FIG. 5. Flowchart 400 commences with operation 402, which includes, while a VoNR-capable UE is being served by a first cell that does not support VoNR, determining that a second cell that does support VoNR is available to serve the UE. Operation 404 includes transferring the UE to service by the second cell. Operation 406 includes providing a VoNR call to the UE through the second cell. In some examples, flowchart 400 commences upon a trigger, such as a mobile origination (MO) or a mobile termination (MT) of voice call service (e.g., an outgoing or incoming voice call, respectively), for which a voice bearer is requested for the UE, or a handover for an ongoing call.

Figure 5:
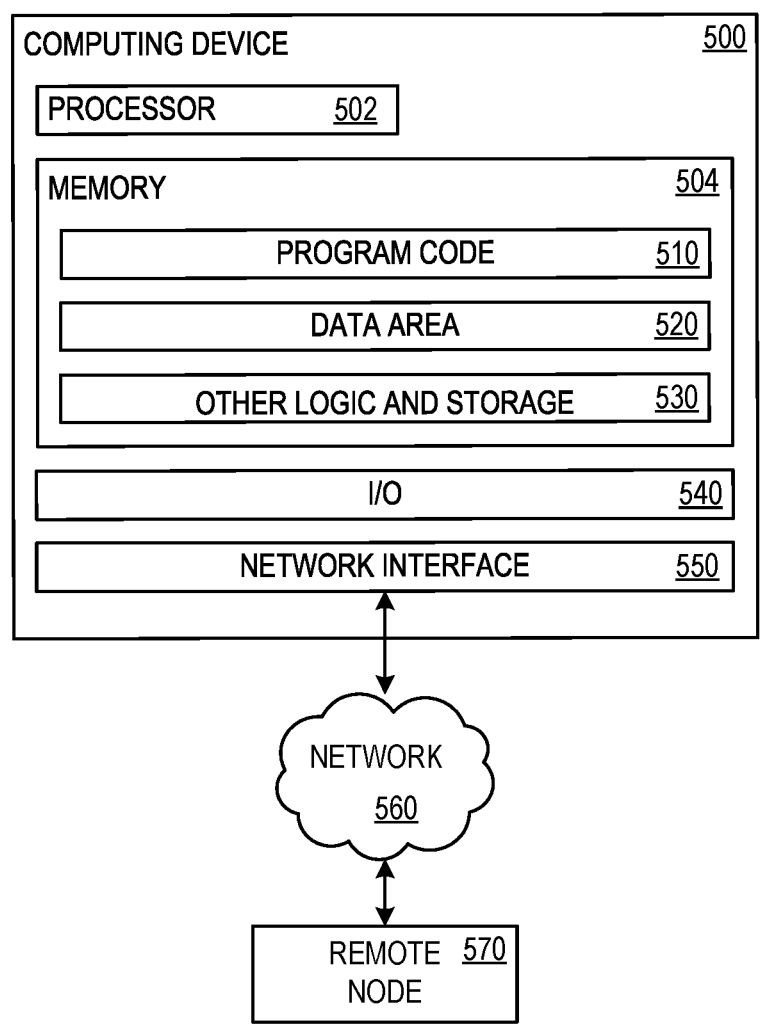
FIG. 5 illustrates a block diagram of a computing device suitable for implementing various aspects of the disclosure.

FIG. 5 illustrates a block diagram of computing device 500 that may be used as a component of arrangement 100, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500.

ADDITIONAL EXAMPLES

An example method of providing a data traffic session comprises: while a VoNR-capable UE is being served by a first cell that does not support VoNR, determining that a second cell that does support VoNR is available to serve the UE; transferring the UE to service by the second cell; and providing a VoNR call to the UE through the second cell.

An example system for providing a data traffic session comprises: a processor; and a computer-readable medium storing instructions that are operative upon execution by the processor to: while a VoNR-capable UE is being served by a first cell that does not support VoNR, determine that a second cell that does support VoNR is available to serve the UE; transfer the UE to service by the second cell; and provide a VoNR call to the UE through the second cell.

One or more example computer storage devices has computer-executable instructions stored thereon, which, upon execution by a computer, cause the computer to perform operations comprising: while a VoNR-capable UE is being served by a first cell that does not support VoNR, determining that a second cell that does support VoNR is available to serve the UE; transferring the UE to service by the second cell; and providing a VoNR call to the UE through the second cell.

Alternatively, or in addition to the other examples described herein, examples include any combination of the following:

determining that the second cell is available to serve the
UE is contemporaneous with the UE transitioning from
idle mode to connected mode;
the transfer comprises a redirection;
determining that the second cell is available to serve the
UE occurs while the UE is already in connected mode;
the transfer comprises a handover;
while the UE is being served by the first cell, determining
that a third cell that does support VoNR is available to
serve the UE;
based on at least load balancing, selecting the second cell
to serve the UE over the third cell;
the first cell comprises a 5G cell operating in a first band;
the second cell comprises a 5G cell operating in a second
band different than the first band;
the first cell comprises a 4G cell;
the second cell comprises a 5G cell;
triggering the determining that the second cell is available
to serve the UE on at least one trigger;
the trigger is selected from the list consisting of: receiving
a notification of an incoming voice call to the UE,
receiving a notification of an outgoing voice call from
the UE, and receiving a notification of a handover of a
voice call for the UE;
a gNB provides the second cell;
determining that the UE is VoNR-capable;
the gNB determines the trigger;
the gNB determines that the UE is VoNR-capable;
the gNB selects the second cell over the third cell;
while the UE is being served by the first cell, the UE is
connected with a VoEPSFB call;
the VoEPSFB call through the first cell is handed over as
the VoNR call through the second cell;
while the UE is being served by the first cell, the UE is
connected with a VoLTE call; and
the VoLTE call through the first cell is handed over as the
VoNR call through the second cell;

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a data traffic session, the method comprising: while a voice over new radio (VoNR) capable user equipment (UE) is being served by a first cell that does not support VoNR, determining that a second cell that does support VONR is available to serve the UE;
transferring the UE to be served by the second cell; and
providing a VoNR call to the UE through the second cell.

2. The method of claim 1, wherein determining that the second cell is available to serve the UE is contemporaneous with the UE transitioning from idle mode to connected mode, and the transfer comprises a redirection.

3. The method of claim 1, wherein determining that the second cell is available to serve the UE occurs while the UE is already in connected mode, and the transfer comprises a handover.

4. The method of claim 1, further comprising:
while the UE is being served by the first cell, determining that a third cell that does support VoNR is available to serve the UE; and
based on at least load balancing, selecting the second cell to serve the UE over the third cell.

5. The method of claim 1, wherein the first cell comprises a fifth generation cellular technology (5G) cell operating in a first band and the second cell comprises a 5G cell operating in a second band different than the first band.

6. The method of claim 1, the first cell comprises a fourth generation cellular technology (4G) cell and the second cell comprises a fifth generation cellular technology (5G) cell.

7. The method of claim 1, further comprising:
triggering the determining that the second cell is available to serve the UE on at least one trigger selected from the list consisting of:
receiving a notification of an incoming voice call to the UE, receiving a notification of an outgoing voice call from the UE, and receiving a notification of a handover of a voice call for the UE.

8. A system for providing a data traffic session, the system comprising; and
a processor; and a computer-readable medium storing instructions that are operative upon execution by the processor to:
while a voice over new radio (VoNR) capable user equipment (UE) is being served by a first cell that does not support VONR, determine that a second cell that does support VONR is available to serve the UE;
transfer the UE to be served by the second cell; and
provide a VoNR call to the UE through the second cell.

9. The system of claim 8, wherein determining that the second cell is available to serve the UE is contemporaneous with the UE transitioning from idle mode to connected mode, and the transfer comprises a redirection.

10. The system of claim 8, wherein determining that the second cell is available to serve the UE occurs while the UE is already in connected mode, and the transfer comprises a handover.

11. The system of claim 8, wherein the operations are further operative to:
while the UE is being served by the first cell, determine that a third cell that does support VoNR is available to serve the UE; and
based on at least load balancing, select the second cell to serve the UE over the third cell.

12. The system of claim 8, wherein the first cell comprises a fifth generation cellular technology (5G) cell operating in a first band and the second cell comprises a 5G cell operating in a second band different than the first band.

13. The system of claim 8, the first cell comprises a fourth generation cellular technology (4G) cell and the second cell comprises a fifth generation cellular technology (5G) cell.

14. The system of claim 8, wherein the operations are further operative to:
   trigger the determining that the second cell is available to serve the UE on at least one trigger selected from the list consisting of:
      receiving a notification of an incoming voice call to the UE, receiving a notification of an outgoing voice call from the UE, and receiving a notification of a handover of a voice call for the UE.

15. One or more computer storage devices having computer-executable instructions stored thereon, which, upon execution by a computer, cause the computer to perform operations comprising:
   while a voice over new radio (VoNR) capable user equipment (UE) is being served by a first cell that does not support VONR, determining that a second cell that does support VONR is available to serve the UE;
   transferring the UE to be served by the second cell; and
   providing a VoNR call to the UE through the second cell.

16. The one or more computer storage devices of claim 15, wherein determining that the second cell is available to serve the UE is contemporaneous with the UE transitioning from idle mode to connected mode, and the transfer comprises a redirection.

17. The one or more computer storage devices of claim 15, wherein determining that the second cell is available to serve the UE occurs while the UE is already in connected mode, and the transfer comprises a handover.

18. The one or more computer storage devices of claim 15, wherein the operations further comprise:
   while the UE is being served by the first cell, determining that a third cell that does support VoNR is available to serve the UE; and
   based on at least load balancing, selecting the second cell to serve the UE over the third cell.

19. The one or more computer storage devices of claim 15,
   wherein the first cell comprises a fifth generation cellular technology (5G) cell operating in a first band and the second cell comprises a 5G cell operating in a second band different than the first band; or
   the first cell comprises a fourth generation cellular technology (4G) cell and the second cell comprises a 5G cell.

20. The one or more computer storage devices of claim 15, wherein the operations further comprise:
   triggering the determining that the second cell is available to serve the UE on at least one trigger selected from the list consisting of:
      receiving a notification of an incoming voice call to the UE, receiving a notification of an outgoing voice call from the UE, and receiving a notification of a handover of a voice call for the UE.

* * * * *